United States Patent
Tamman et al.

(10) Patent No.: US 6,851,165 B2
(45) Date of Patent: Feb. 8, 2005

(54) APPARATUS FOR RETAINING A POPPET SEAL

(75) Inventors: Allen Tamman, Chatham (CA); David Rene Forgeron, Chatham (CA)

(73) Assignee: Siemens VDO Automotive, Inc., Chatham (CA)

(*) Notice: Subject to any disclaimer, the term of this patent is extended or adjusted under 35 U.S.C. 154(b) by 133 days.

(21) Appl. No.: 10/252,570

(22) Filed: Sep. 24, 2002

(65) Prior Publication Data

US 2004/0055135 A1 Mar. 25, 2004

(51) Int. Cl.$^7$ .............................. B23P 11/00; B21K 1/22
(52) U.S. Cl. ................ 29/243.5; 29/888.45; 29/888.46; 29/512; 29/513; 277/924
(58) Field of Search ............................ 29/888.3, 888.4, 29/888.43, 888.45, 888.46, 406, 509, 512, 513, 243.5; 277/924; 72/352, 361

(56) References Cited

U.S. PATENT DOCUMENTS

| | | | | |
|---|---|---|---|---|
| 2,436,931 A | * | 3/1948 | Marencik ............... | 29/888.451 |
| 2,724,884 A | | 11/1955 | Jones ........................ | 24/213 |
| 3,394,572 A | * | 7/1968 | Allman ...................... | 72/168 |
| 3,399,018 A | | 8/1968 | Leblanc ..................... | 351/154 |
| 3,978,190 A | | 8/1976 | Kurz, Jr. et al. ........... | 264/242 |
| 4,219,912 A | | 9/1980 | Adams ....................... | 129/214 |
| 4,294,249 A | | 10/1981 | Sheehan et al. ........... | 128/214 |
| 4,346,870 A | * | 8/1982 | Chute et al. ............... | 251/356 |
| 4,474,723 A | | 10/1984 | Irmer ........................ | 264/296 |
| 4,975,132 A | | 12/1990 | Thompson ................. | 156/69 |
| 5,188,620 A | | 2/1993 | Jepson et al. ............. | 604/283 |
| 5,351,383 A | | 10/1994 | Behnke et al. ............ | 29/430 |
| 5,368,801 A | | 11/1994 | Vaillancourt ............. | 264/249 |
| 5,400,500 A | | 3/1995 | Behnke et al. ............ | 29/785 |
| 5,984,563 A | | 11/1999 | Wu .......................... | 403/282 |
| 6,261,266 B1 | | 7/2001 | Jepson et al. ............. | 604/201 |
| 6,460,566 B1 | | 10/2002 | Perry et al. .............. | 137/495 |

FOREIGN PATENT DOCUMENTS

| | | | |
|---|---|---|---|
| JP | 02-207449 | * | 8/1990 |
| JP | 11-176394 | * | 7/1999 |

\* cited by examiner

*Primary Examiner*—Eric Compton (57) ABSTRACT

An apparatus and method for retaining a poppet seal with respect to a housing of an integrated pressure management system. The integrated pressure management system includes an aperture near a mouth of a housing, and the mouth includes a tip that is deformable so as to retain the poppet seal in the aperture. The apparatus includes a die and a collet. The die moves along an axis, and includes a face adapted to engage the mouth. The face includes a forming-over section adapted to engage the tip. The collet surrounds the die and extends along the axis between first and second axial ends. The collet includes first and second portions. The first portion extends between the first axial end and an intermediate axial position. The second portion extends between the intermediate axial position and the second axial end, and includes a plurality of segments positioned about the axis. Each of the plurality of segments includes at the second axial end a radially inward projecting tooth, and each tooth includes a tapered face.

10 Claims, 7 Drawing Sheets

APPARATUS FOR RETAINING A POPPET SEAL

FIELD OF THE INVENTION

This disclosure relates to an apparatus and a method of retaining a seal, and more particularly, to retaining a poppet seal with respect to a housing of an integrated pressure management system. A preferred embodiment of an integrated pressure management system is disclosed in U.S. patent application Ser. No. 09/542,052, filed Mar. 31, 2000, which is incorporated by reference herein in its entirety.

BACKGROUND OF THE INVENTION

The preferred embodiment of the integrated pressure management system includes at least two operational configurations. In a first configuration of the integrated pressure management system, a poppet is disengaged from a poppet seal so as to permit fluid flow via a gap between the poppet and the poppet seal. In a second configuration of the integrated pressure management system, the poppet is engaged with the poppet seal so as to close the gap and to prevent the fluid flow. Preferably, the poppet seal is retained with respect to a housing of the integrated pressure management system.

According to the preferred embodiment of the integrated pressure management system, the poppet seal would be retained in an aperture near a mouth of the housing, which is molded from plastic. Preferably, the plastic at the mouth is softened by heating, and then formed over the seal without overheating the seal.

Attempts to form-over the mouth using spin forming and orbital forming operations were not successful.

Figures 1A, 1B, 1C, 1D:
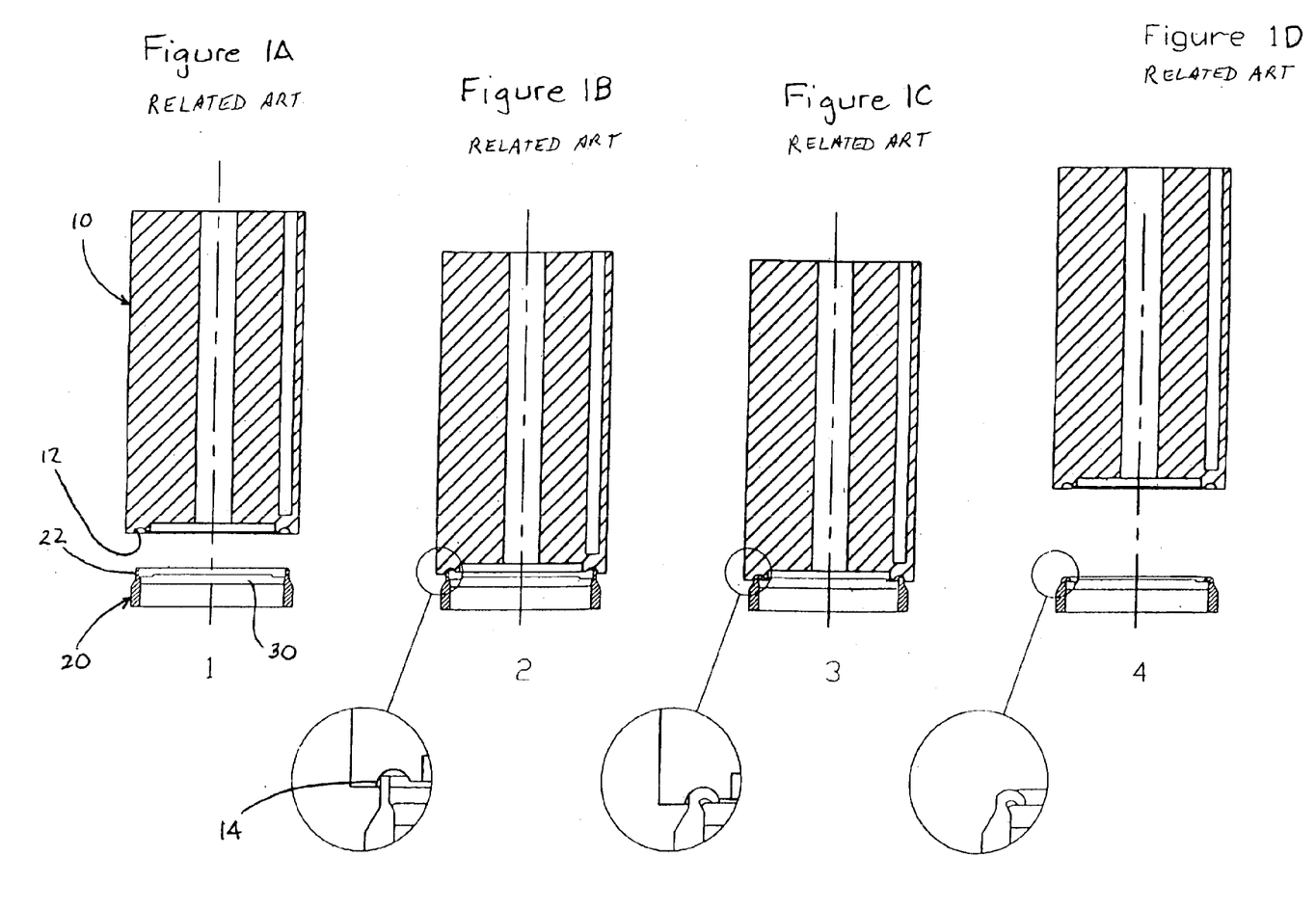
FIGS. 1A-1D illustrate a method using a conventional apparatus for retaining a seal in a housing.

Referring to FIGS. 1A-1D, another attempt to form-over a mouth 20 included positioning a conventional die 10 above the mouth 20 of the aperture in which a seal 30 is seated (FIG. 1A). The die 10, which is heated, is lowered against a tip 22 with a relatively low force, and by heating begins to soften the tip 22 (FIG. 1B). When the tip 22 is sufficiently softened, the die 10 can be pressed with a relatively greater force toward the mouth 20 so as to form over the tip 22 (FIG. 1C). After forming over the tip 22, the die 10 is raised and the seal 30 is retained in the aperture 20 (FIG. 1D). However, approximately 50% of the attempts to use the conventional die 10 resulted in unsuccessful retentions of the seal 30 in the mouth 20.

Figures 2A, 2B:
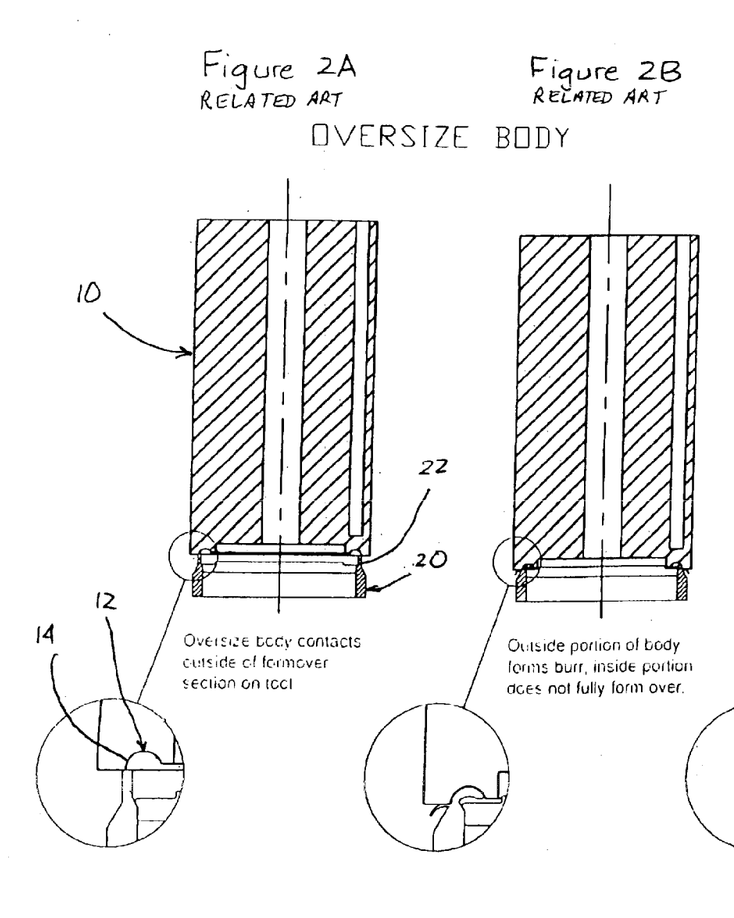
FIGS. 2A-2D illustrate some of the problems associated with the conventional apparatus and method as shown in FIG. 1.
Figure 2C:
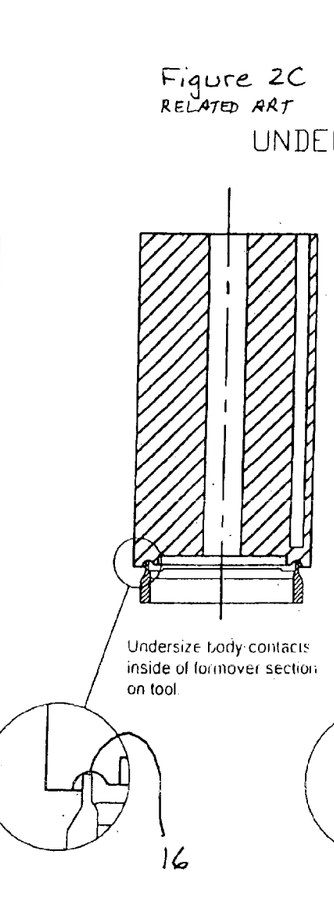
Figure 2D:
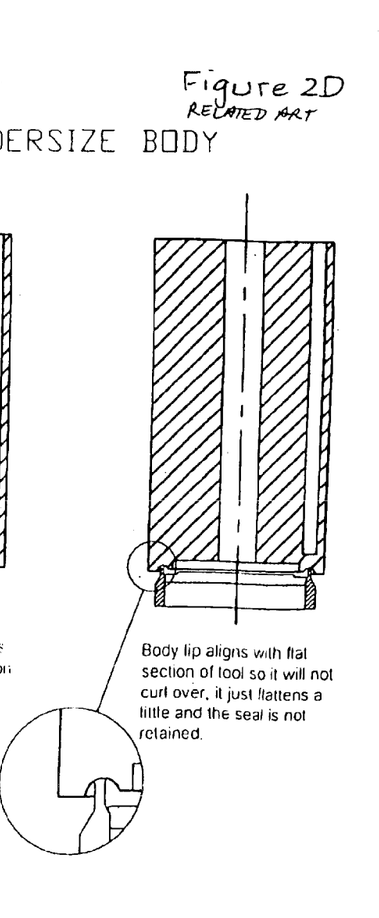

The inventors discovered that the conventional die 10 was too sensitive to dimensional variations of the tip 22. In particular, the inventors discovered that the form-over section 12 of the conventional die 10 includes a steeply inclined portion 14 that must contact the tip 22 in order to successfully retain the seal 30. Referring to FIGS. 2A and 2B, if the tip 22 is oversized with respect to the form-over section 12, the radially outside portion of the tip 22 can form a burr and the radially inside portion of the tip 22 does not fully form-over. Referring to FIGS. 2C and 2D, if the tip 22 is undersized with respect to the form-over section 12, the tip 22 engages a less inclined portion 16 of the form-over section 12. Rather than the tip 22 being formed over, the tip 22 is only slightly flattened without the seal 30 being retained.

The shape of the housing according to the preferred embodiment of the integrated pressure management system makes it very difficult to get a perfectly round and precisely sized tip 22. Adjustments to a conventional die 10, e.g., adjusting the diameter of the form-over section 12, cannot resolve the problems that arise due to out of round parts having sections of the circumference that are oversize or undersize with respect to the form-over section 12 of the conventional die 10. Thus, the inventors have identified a need to provide an apparatus and method that compensate for dimensional variations in the tips 22 and that can substantially ensure proper form-overs, regardless of variations in the size or roundness of the tip 22.

SUMMARY OF THE INVENTION

The present invention provides an apparatus for retaining a poppet seal with respect to a housing of an integrated pressure management system. The integrated pressure management system includes an aperture near a mouth of a housing, and the mouth includes a tip that is deformable so as to retain the poppet seal in the aperture. The apparatus includes a die and a collet. The die moves along an axis, and includes a face adapted to engage the mouth. The face includes a forming-over section adapted to engage the tip. The collet surrounds the die and extends along the axis between first and second axial ends. The collet includes first and second portions. The first portion extends between the first axial end and an intermediate axial position. The second portion extends between the intermediate axial position and the second axial end, and includes a plurality of segments positioned about the axis. Each of the plurality of segments includes at the second axial end a radially inward projecting tooth, and each tooth includes a tapered face.

The present invention also provides a method of deforming a tip of a mouth of a housing of an integrated pressure management system. The tip of the mouth has at least one of an oversize portion, a nominal portion, and an undersize portion. The method includes deflecting and deforming. The deflecting includes deflecting radially inward at least one of the oversize and nominal portions. The oversize portion is deflected a first distance, and the nominal portion is deflected a second distance. And the deforming provides a deformed configuration of the tip that is substantially similar for each of the oversize, nominal, and undersize portions.

The present invention also provides a method of retaining a poppet seal with respect to a housing of an integral pressure management system. The method includes positioning the poppet seal in a mouth of the housing. The mouth includes a tip in a receiving configuration, that permits passage of the poppet seal into the mouth. And the method includes deforming the tip from the receiving configuration to a retaining configuration. The retaining configuration prevents passage of the poppet seal out of the mouth. The retaining configuration is substantially similar for each of undersize, nominal size, and oversize portions of the tip in the receiving configuration.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

DETAILED DESCRIPTION OF THE PREFERRED EMBODIMENT

FIGS. 3A-4D show a preferred embodiment of a collet 100 and a cooperating die 200. The collet 100 extends along an axis A between first and second axial ends 102,104, and includes a first portion 110 and a second portion 120. The first portion 110 can have the shape of a hollow cylindrical body that extends between the first axial end 102 and an intermediate axial position 106. The first portion 110 can include a first mounting fixture 112 that cooperates with the die 200 as will be described below in greater detail.

The second portion 120 of the collet 100 includes a plurality of segments 122 that can have an arcuate shape when viewed along the axis A, and that extend between the intermediate axial position 106 and the second axial end 104. The arcuate segments 122 are separated from one another by gaps 124.

Figure 3A:
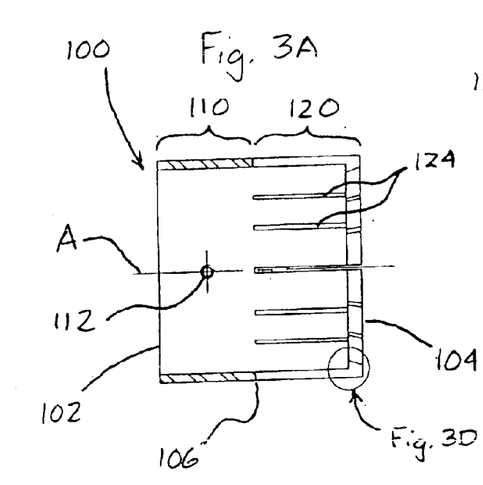
FIG. 3A is a partial cross-section view of a collet according to the present invention.

Preferably, the arcuate segments are cantilevered extensions of the first portion 110, and as such the inside diameter of the first portion 110 is substantially equal to the inside radius of the arcuate segments 122 and the outside diameter of the first portion 110 is substantially equal to the outside radius of the arcuate segments 122. By virtue of the cantilever mounting at the intermediate axial position 106, the arcuate segments 122 are radially movable at the second axial end 104.

Figure 3B:
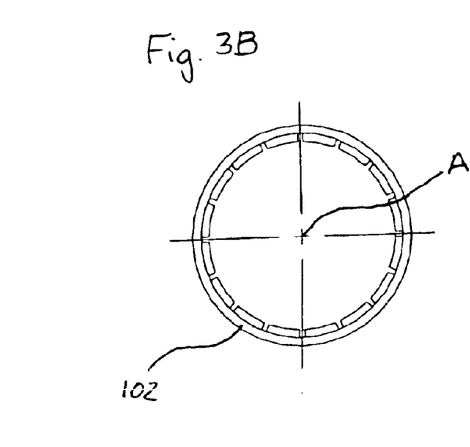
FIGS. 3B and 3C are top and bottom plan views of the collet shown in FIG. 3A.
Figure 3C:
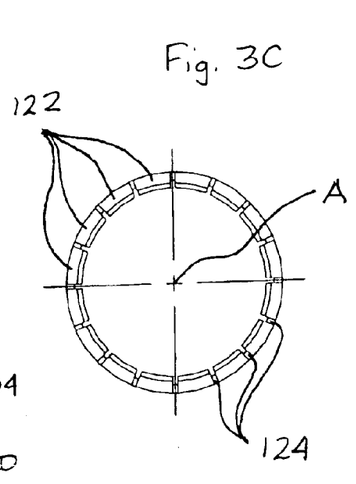
Figure 3D:
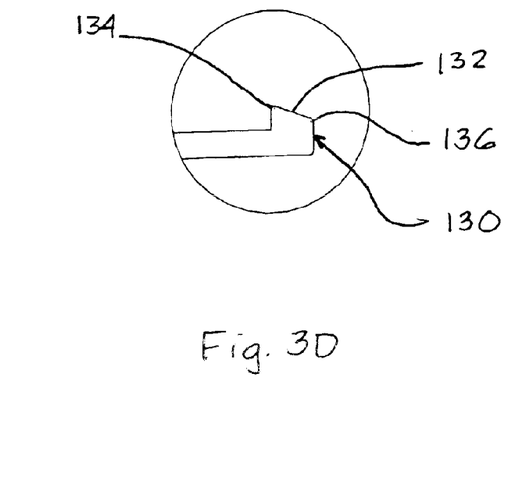
FIG. 3D is a detail view of the collet shown in FIG. 3A.

Each of the plurality of arcuate segments 122 includes at the second axial end 104 a radially inward projecting tooth 130. Each tooth 130 includes a tapered face 132 that lies on an imaginary conical surface that is centered about the axis A. The tapered faces 132 extend between a minimum radius edge 134 and a maximum radius edge 136.

Preferably, there are sixteen arcuate segments 122 that are separated by sixteen gaps 124. Of course, there can be more than or less than sixteen arcuate segments and gaps 122, 124, as long as the arcuate segments 122 are radially movable at the second axial end 104. Also, the segments 122 can have other than an arcuate cross-section, or there can be physical characteristics, e.g., creases, at the axially intermediate position 106 for facilitating the movement of the arcuate segments 122 with respect to the first portion 110.

Figure 4A:
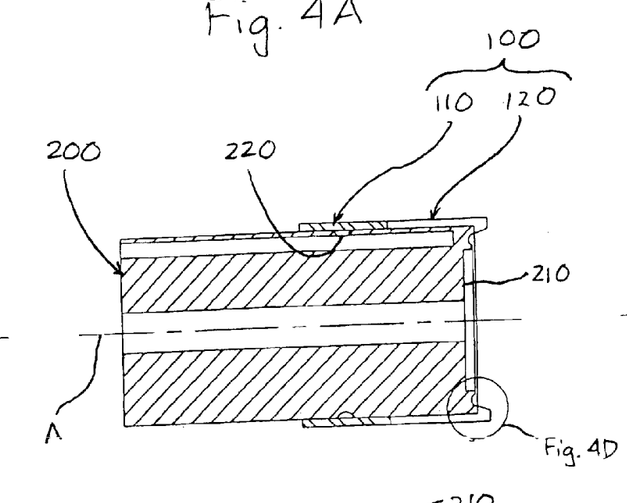
FIG. 4A is a partial cross-section view of a die and collet according to the present invention.
Figure 4B:
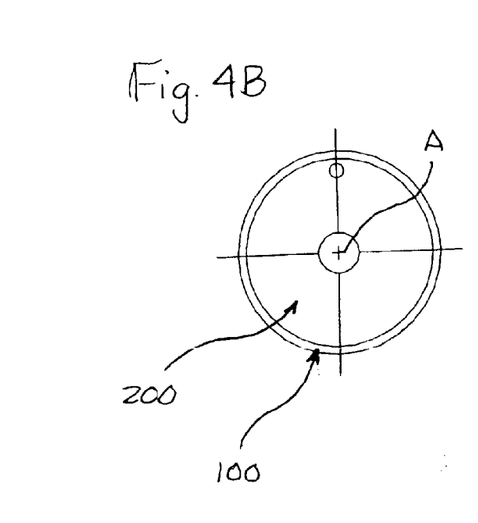
FIGS. 4B and 4C are top and bottom plan views of the die and collet shown in FIG. 4A.
Figure 4C:
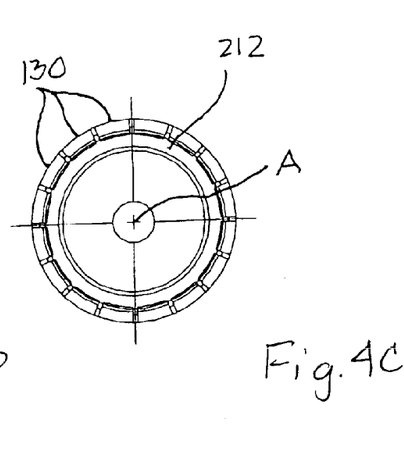
Figure 4D:
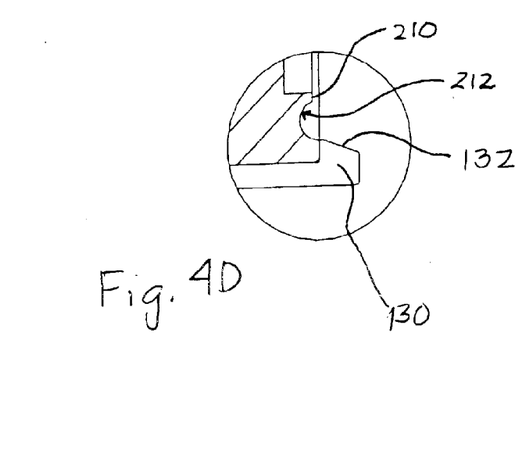
FIG. 4D is a detail view of the die and collet shown in FIG. 4A.

The die 200 is similar to the conventional die 10 in at least two aspects, and is distinct in at least three other aspects. The die 200 is similar in that it is heated for softening the tip 22, and similarly includes a face 210 having a form-over section 212. Preferably, the form-over section 212 includes an annular depression in the face 210, and the depression has a substantially semi-circular cross-section when viewed in an imaginary radial plan that includes the axis A.

The die 200 is distinct at least in that the collet 100 surrounds the die 200 proximate to the face 210, includes a second mounting fixture 220, and the size of the form-over section 212 is smaller than that of the conventional die 10. That is to say, the inside diameter of the first portion 110 of the collet 100 (as well as the inside radius of the arcuate segments 122) substantially corresponds to the outside diameter of the die 200. And the teeth 130 are substantially radially movable along the face 210. The second mounting fixture 220 of the die 200 cooperatively engages the first mounting fixture 112 of the collet 100. Preferably, the first and second mounting fixtures maintain the relative relationship of the collet 100 and die 200, while allowing the movement of the arcuate segments 122 and teeth 130 with respect to the die 200. As will be discussed below in greater detail, the size of the form-over section 212 is reduced relative to the size of the form-over section 12 of the conventional die 10. Preferably, the form-over section 212 is located at a reduced radial dimension with respect to the axis A.

A process for using the hot-forming tool according to the present invention, e.g., the collet 100 and die 200, will now described to show how the present invention accommodates nominal size tips, and compensates for undersize, oversize tips 22. It is notable that out-of-position and out-of-round tips 22 may include different portions that are undersize, nominal size, and oversize.

Figures 5A, 5B:
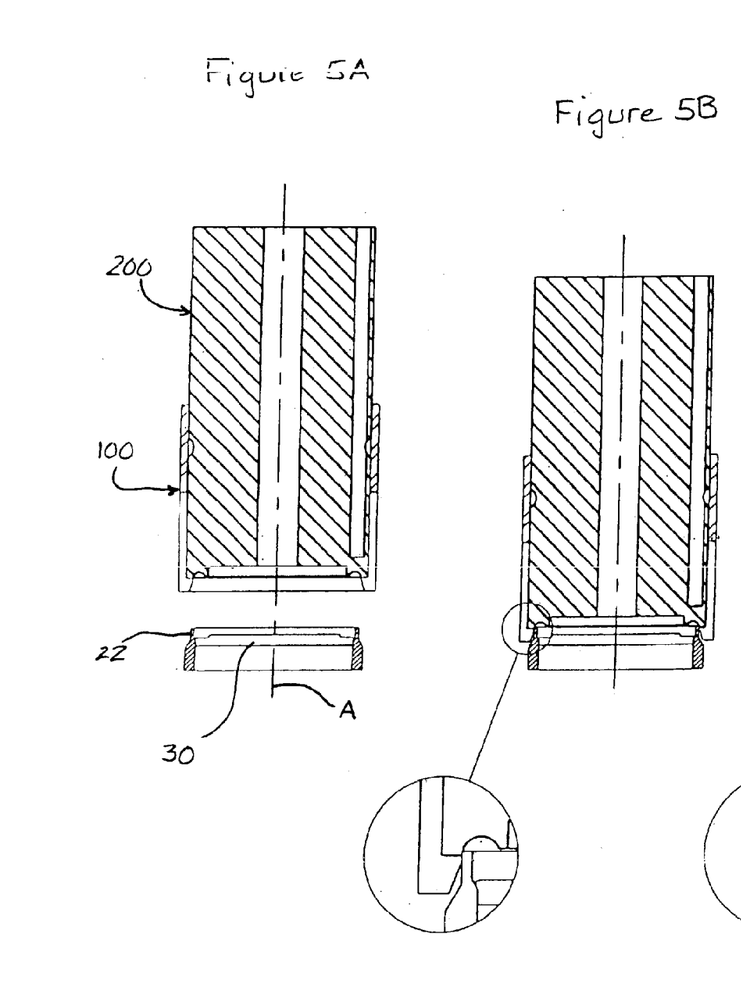
FIGS. 5A-5D illustrate a method using a collet and die apparatus according to a preferred embodiment for retaining a seal in a nominal sized housing.
Figure 5C:
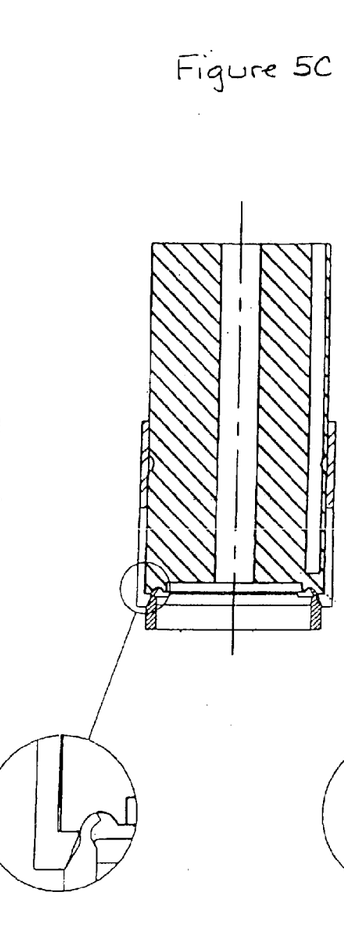
Figure 5D:
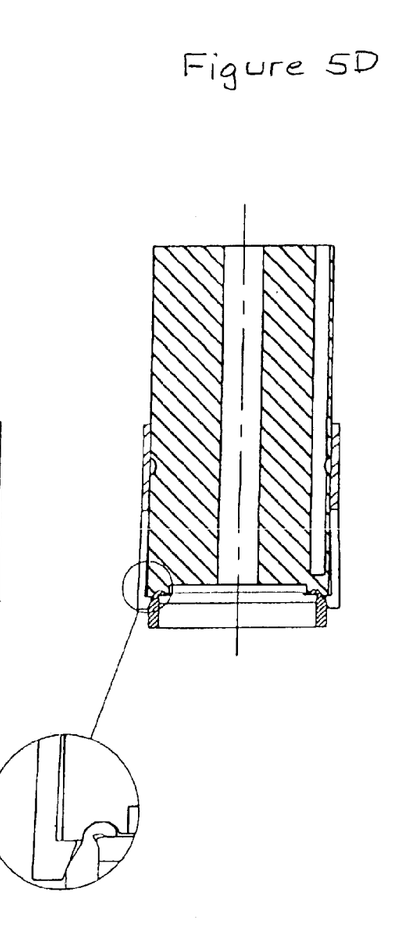

FIGS. 5A-5D illustrate forming over a nominal size tip 22. Referring to FIG. 5A, a seal 30 is seated into an aperture and then positioned under the hot-forming tool. Referring to FIG. 5B, the hot-forming tool comes down at a low force (e.g., approximately 150 pounds) and rests on the tip 22. This allows the tip 22 to be heated for a few seconds, which softens the tip 22. Referring to FIG. 5C, the force that the hot-forming tool applies to the softened tip is increased (e.g., approximately 600 pounds) and the tip 22 starts to curl inwards. Referring to FIG. 5D, the increased force is maintained and the hot-forming tool curls the plastic over tightly. Additionally, the arcuate segments 122 are displaced radially outward as the tapered faces 132 of the teeth 130 engage an enlarged portion 24 of the mouth 20. Thereafter, the hot-forming tool is lifted after a couple of seconds.

Figure 6A:
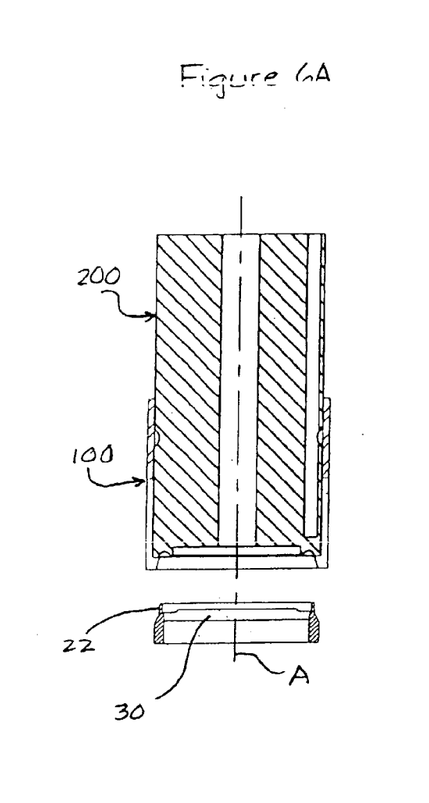
FIGS. 6A-6D illustrate a method using a collet and die apparatus according to a preferred embodiment for retaining a seal in an oversized housing.
Figure 6B:
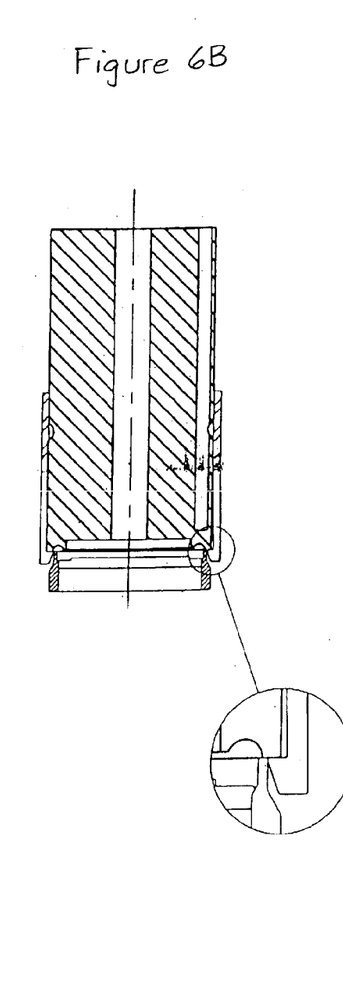
Figure 6C:
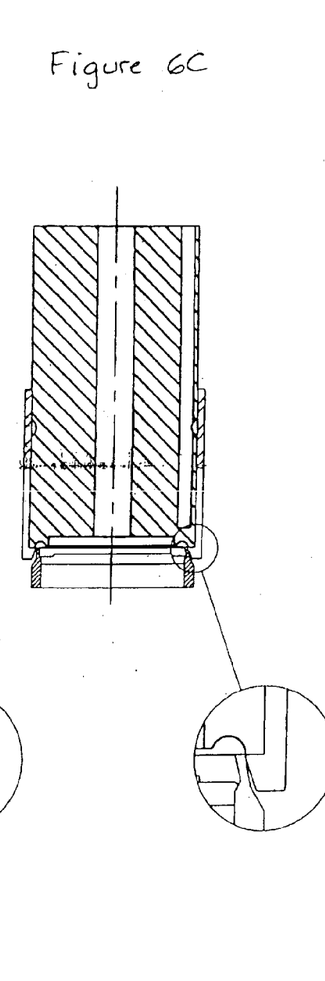
Figure 6D:
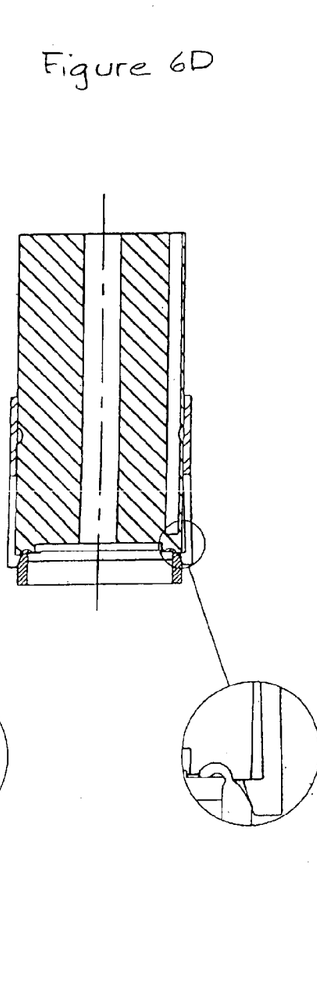

FIGS. 6A-6D illustrate forming-over an oversized or offset tip 22. Referring to FIG. 6A, a seal 30 is seated into an aperture and then positioned under the hot-forming tool. Referring to FIG. 6B, the hot-forming tool comes down at a low force (e.g., approximately 150 pounds) and rests on the tip 22. The arcuate segments 122 of the collet 100 are pushed radially outward due to engagement with the tip 22. Conversely, the teeth 130 exert a radially inward directed force on the tip 22, which tends to deflect the tip 22 into alignment with the forming-over section 212 of the die 200. The tip 22 starts to heat up and soften. Referring to FIG. 6C, as the tip 22 softens, the radially inward directed force exerted by the collet 100 deflects the tip 22 inward so that it aligns with the forming-over section 212 of the die 200. Referring to FIG. 6D, the force that the hot-forming tool applies to the softened tip is increased (e.g., approximately 600 pounds) and the tip 22 starts to curl inwards until the hot-forming tool curls the plastic over tightly.

FIGS. 7A-7D illustrate forming-over an undersized or offset tip 22. During an initial trial using the collet 100 with the conventional die 10, the inventors discovered that the tip 22 would not properly form-over. Consequently, the inventors designed the die 200 so as to have a forming-over section 212 with a smaller diameter with respect to the axis A. Thus, a tip 22 that would have otherwise engaged the less inclined portion 16 of the form-over section 12 of the conventional die 10, will engage a steeply inclined portion of the forming-over section 212 of the die 200. Moreover, radially inward travel of the arcuate segments 122 is limited by engagement with the die 200 so that the teeth 130 do not radially push an undersized portion of the tip 22 further inward, i.e., the minimum radius edge 134 of the tapered face 132 is substantially aligned with the edge of the smaller diameter forming-over section 212. Thus, the die 200 treats tips 22 that would have been undersized, nominal sized, and oversized for the convention die 10, as nominal sized, oversized, and extra-oversized tips 22, respectively. This "size shift" is made possible in the preferred embodiment by the collet 100 providing a radially inward bias to the oversized and extra-oversized tips 22, and by the reduced size forming-over section 212 (e.g., having a smaller diameter with respect to the axis A, as compared to the conventional die 10).

According to a preferred embodiment, the smaller diameter of the forming-over section 212 is determined based on the nominal dimension of the tip 22, less the negative tolerance of the tip 22. For example, if the nominal diameter of the tip 22 is 36.5 millimeters with a tolerance of +0.5/−0.3 millimeters, the diameter of the forming-over section 212 is selected as 36.2 millimeters. As it is used in this example, the term "diameter" refers to a measurement made at the median with respect to radial thickness. Of course, the diameter could alternatively be measured with respect to an inside diameter or an outside diameter.

Figure 7A:
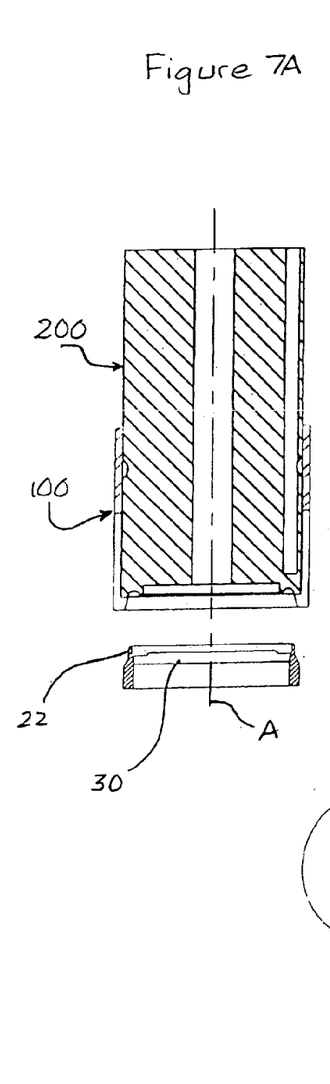
FIGS. 7A-7D illustrate a method using a collet and die apparatus according to a preferred embodiment for retaining a seal in an undersized housing.
Figures 7B, 7C, 7D:
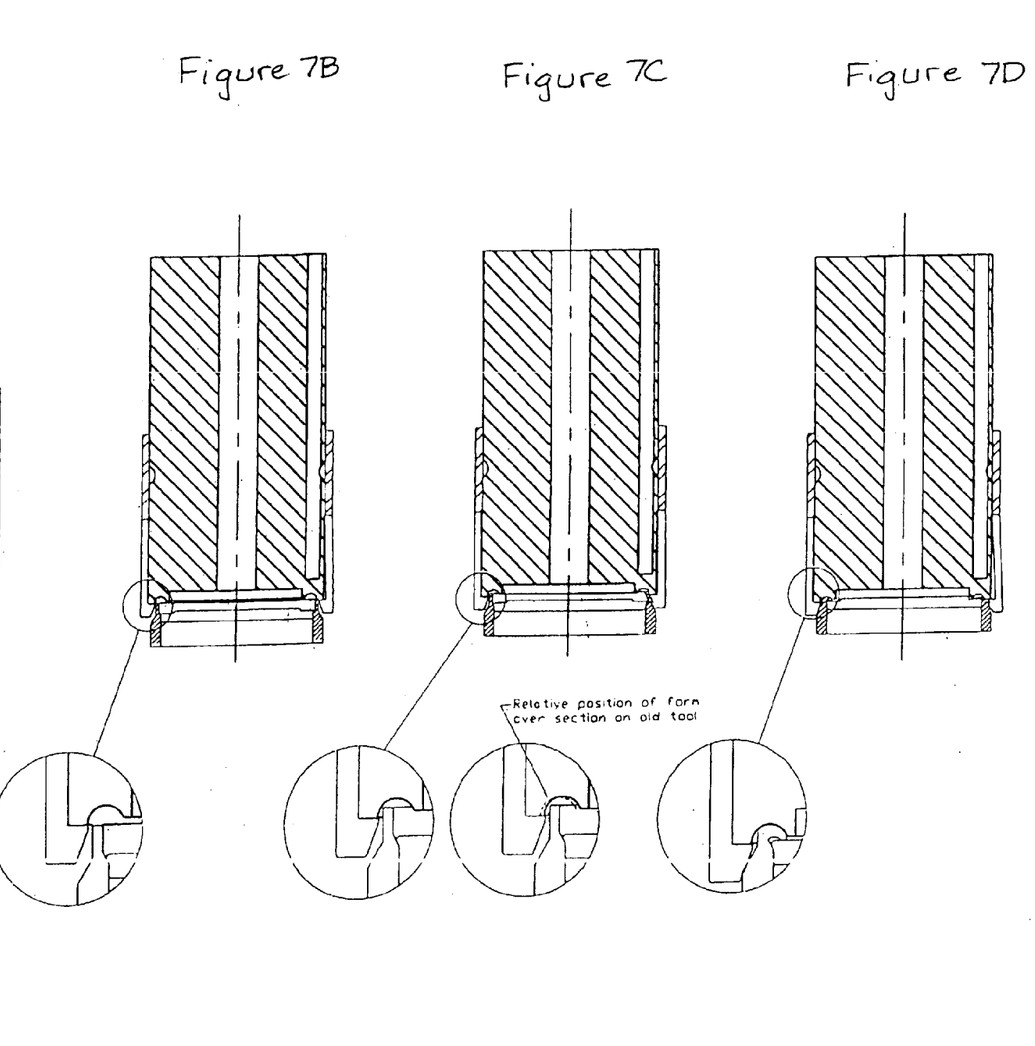

Referring to FIG. 7A, a seal 30 is seated into an aperture and then positioned under the hot-forming tool. Referring to FIGS. 7B and 7C, the hot-forming tool comes down at a low force (e.g., approximately 150 pounds) and rests on the tip 22. This allows the tip 22 to be heated for a few seconds, which softens the tip 22. Referring to FIG. 7D, the force that the hot-forming tool applies to the softened tip is increased (e.g., approximately 600 pounds) and the tip 22 starts to curl inwards until the hot-forming tool curls the plastic over tightly.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An apparatus for retaining a poppet seal with respect to a housing of an integrated pressure management system, the integrated pressure management system including an aperture near a mouth of a housing, and the mouth including a tip that is deformable so as to retain the poppet seal in the aperture, the apparatus comprising:

a die movable along an axis, the die including a face adapted to engage the mouth, and the face including a forming-over section adapted to engage and deform the tip; and a collet surrounding the die and extending along the axis between first and second axial ends of the collet, the second axial end of the collet being axially spaced from the face of the die, the collet including:

a first portion extending between the first axial end and an intermediate axial position; and a second portion extending between the intermediate axial position and the second axial end, the second portion including a plurality of segments positioned about the axis, each of the plurality of segments including at the second axial end a radially inward projecting tooth, and each tooth including a tapered face.

2. The apparatus according to claim 1, wherein the forming-over section circumscribes the axis and comprises a semi-circular cross-section in a radial plane including the axis.

3. The apparatus according to claim 1, wherein the die comprises a heating element.

4. The apparatus according to claim 1, wherein the die comprises a cylindrical body extending along the axis from the face.

5. The apparatus according to claim 4, wherein the first portion of the collet is attached to the cylindrical body of the die.

6. The apparatus according to claim 1, wherein the second portion of the collet comprises a plurality of gaps, and the plurality of segments and the plurality of gaps are alternatingly positioned about the axis.

7. The apparatus according to claim 1, wherein the tapered faces lie on an imaginary conical surface that is centered about the axis.

8. The apparatus according to claim 1, wherein each of the plurality of segments at the intermediate position comprise a flexible connection with respect to the first portion.

9. The apparatus according to claim 8, wherein each of the plurality of segments are radially movable with respect to the axis, and the teeth are radially slidable on the face of the die.

10. The apparatus according to claim 1, wherein the forming-over section is located on the face of the die at a radial distance from the axis, the radial distance is approximately equal to a nominal size of the tip minus a tolerance value, and the tolerance value is approximately equal to a difference between minimum and nominal sizes of the tip.

\* \* \* \* \*